United States Patent
Mochizuki

(10) Patent No.: US 9,527,365 B2
(45) Date of Patent: Dec. 27, 2016

(54) VEHICLE HEIGHT ADJUSTING APPARATUS

(71) Applicant: KAYABA INDUSTRY CO., LTD., Tokyo (JP)

(72) Inventor: Takahisa Mochizuki, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/650,261

(22) PCT Filed: Dec. 4, 2013

(86) PCT No.: PCT/JP2013/082576
§ 371 (c)(1),
(2) Date: Jun. 5, 2015

(87) PCT Pub. No.: WO2014/088027
PCT Pub. Date: Jun. 12, 2014

(65) Prior Publication Data
US 2015/0314664 A1    Nov. 5, 2015

(30) Foreign Application Priority Data
Dec. 6, 2012 (JP) .................................. 2012-266948

(51) Int. Cl.
*B60G 17/00* (2006.01)
*B60G 17/027* (2006.01)
(Continued)

(52) U.S. Cl.
CPC ........... *B60G 17/0272* (2013.01); *F16F 1/121* (2013.01); *F16F 9/38* (2013.01); *F16F 9/56* (2013.01);
(Continued)

(58) Field of Classification Search
CPC ................... B60G 2202/312; B60G 17/0272; B60G 17/0525; B60G 2202/31; B60G 2202/32; B60G 2500/324; B60G 2202/413; B60G 2300/12; F16F 9/56; F16F 9/38
(Continued)

(56) References Cited

U.S. PATENT DOCUMENTS 6,155,545 A * 12/2000 Noro ................... B60G 15/063
188/322.16
6,676,119 B2 * 1/2004 Becker ............... B60G 17/0272
267/177
(Continued)

FOREIGN PATENT DOCUMENTS

AT  DE 102010036238 A1 *  3/2012  .......... B60G 15/067
JP  S57-129942 A          8/1982
(Continued)

OTHER PUBLICATIONS

Nagai et al. JP 10-292841 English Machine Translation.*

*Primary Examiner* — Karen Jane Beck
(74) *Attorney, Agent, or Firm* — Rabin & Berdo, P.C.

(57) ABSTRACT

A vehicle height adjusting apparatus includes: an annular movable spring receiver in sliding contact with a guide surface formed on an outer periphery of an outer tube of a damper, the movable spring receiver being configured to support one side end of a suspension spring, the suspension spring biasing the damper in an expansion direction; a driving mechanism configured to drive the movable spring receiver in an axial direction of the damper; an auxiliary spring configured to bias the movable spring receiver to the suspension spring side; and a dust cover configured to cover a portion on the guide surface, the movable spring receiver being in sliding contact with the guide surface in the portion. The dust cover is held on the outer tube by means of a spring force of the auxiliary spring.

5 Claims, 5 Drawing Sheets

(51) Int. Cl.
*F16F 9/38* (2006.01)
*F16F 9/56* (2006.01)
*F16F 1/12* (2006.01)
*B60G 17/052* (2006.01)

(52) U.S. Cl.
CPC ....... *B60G 17/0525* (2013.01); *B60G 2202/31* (2013.01); *B60G 2202/312* (2013.01); *B60G 2202/32* (2013.01); *B60G 2202/413* (2013.01); *B60G 2300/12* (2013.01); *B60G 2500/324* (2013.01)

(58) Field of Classification Search
USPC ...................................... 280/6.157
See application file for complete search history.

(56) References Cited

U.S. PATENT DOCUMENTS

| | | | |
|---|---|---|---|
| 8,205,864 B2 * | 6/2012 | Michel | B60G 15/065 188/299.1 |
| 2009/0095584 A1 * | 4/2009 | Kondo | B60G 11/15 188/267 |
| 2015/0290992 A1 * | 10/2015 | Mochizuki | B60G 15/062 280/5.514 |
| 2015/0314664 A1 * | 11/2015 | Mochizuki | F16F 9/38 280/6.157 |

FOREIGN PATENT DOCUMENTS

| | | |
|---|---|---|
| JP | 10-299811 A | 11/1998 |
| JP | H10-292841 A | 11/1998 |
| JP | H11-182609 A | 7/1999 |
| JP | 2006-226416 A | 8/2006 |
| JP | 2010-149550 A | 7/2010 |

\* cited by examiner

VEHICLE HEIGHT ADJUSTING APPARATUS

TECHNICAL FIELD

The present invention relates to a vehicle height adjusting apparatus.

BACKGROUND ART

Between a vehicle body and a wheel in a vehicle, a damper for generating a damping force and a suspension spring for biasing the damper in an expansion direction are provided in parallel. The suspension spring absorbs an impact caused by irregularity on a road surface, and the damper suppresses an expansion/contraction motion of the suspension spring associated with impact absorption. As a result, transmission of the impact caused by the irregularity on the road surface to the vehicle body is suppressed.

In a case where loads or occupants increase, compression amounts of the suspension spring and the damper become larger and a vehicle height becomes lower. In a case where loads or occupants decrease, the compression amounts of the suspension spring and the damper become smaller and the vehicle height becomes higher. Thus, it is known to mount a vehicle height adjusting apparatus capable of adjusting the vehicle height on a vehicle.

JP2010-149550A discloses a vehicle height adjusting apparatus. As shown in FIG. 4, the vehicle height adjusting apparatus includes: a movable spring receiver 8 for supporting one—side end (an upper end in FIG. 4) of a suspension spring S1 that is mounted on an outer periphery of an outer tube T of a damper D and biases the damper D in an expansion direction; and a driving mechanism M for driving the movable spring receiver 8 in an axial direction of the damper D.

The driving mechanism M includes: an annular housing 90 fixed to a side opposite to the suspension spring (an upper side in FIG. 4) of the movable spring receiver 8 on the outer periphery of the outer tube T; a jack chamber J formed between the housing 90 and the outer tube T and filled with an operating fluid; a jack piston 91 continuing to the side opposite to the suspension spring of the movable spring receiver 8 (the upper side in FIG. 4) and movably inserted between the housing 90 and the outer tube T so as to close an opening on the suspension spring side of the jack chamber J (a lower side in FIG. 4); and a pump P configured to suction and discharge the operating fluid with respect to the jack chamber J.

In a case where the vehicle height is lowered, by supplying the operating fluid to the jack chamber J by means of the pump P, the jack piston 91 is pushed out of the housing 90, and the damper D is projected, whereby the vehicle height can be raised. In a case where the vehicle height is raised, by discharging the operating fluid from the jack chamber J by means of the pump P, the jack piston 91 is pushed into the housing 90, and the damper D is contracted, whereby the vehicle height can be lowered.

JP11-182609A discloses a suspension spring force adjusting apparatus. As shown in FIG. 5, the suspension spring force adjusting apparatus includes a dust cover 2C that suppresses adhesion of dusts by covering a portion where the movable spring receiver 8 and the jack piston 91 are in sliding contact.

SUMMARY OF INVENTION

In the conventional vehicle height adjusting apparatus described above, a load of the suspension spring S1 is large. For this reason, in case of adjusting the vehicle in a direction to raise the vehicle height, a large force is required for driving the movable spring receiver 8.

Thus, in order to facilitate driving of the movable spring receiver 8 even if the load of the suspension spring S1 is large, it is thought that the movable spring receiver 8 is sandwiched by the suspension spring S1 and an auxiliary spring so as to be biased by the auxiliary spring to the suspension spring side, that is, in a direction in which the suspension spring S1 contracts.

However, since a structure of the vehicle height adjusting apparatus is complicated by providing the auxiliary spring, mounting of a dust cover becomes difficult.

It is an object of the present invention to facilitate mounting of a dust cover in a vehicle height adjusting apparatus provided with an auxiliary spring.

According to an aspect of the present invention, there is provided a vehicle height adjusting apparatus includes: an annular movable spring receiver in sliding contact with a guide surface formed on an outer periphery of an outer tube of a damper, the movable spring receiver being configured to support one side end of a suspension spring, the suspension spring biasing the damper in an expansion direction; a driving mechanism configured to drive the movable spring receiver in an axial direction of the damper; an auxiliary spring configured to bias the movable spring receiver to the suspension spring side; and a dust cover configured to cover a portion on the guide surface, the movable spring receiver being in sliding contact with the guide surface in the portion, wherein the dust cover is held on the outer tube by means of a spring force of the auxiliary spring.

DESCRIPTION OF EMBODIMENT

Hereinafter, an embodiment of the present invention will be described with reference to the accompanying drawings.

Figure 1:
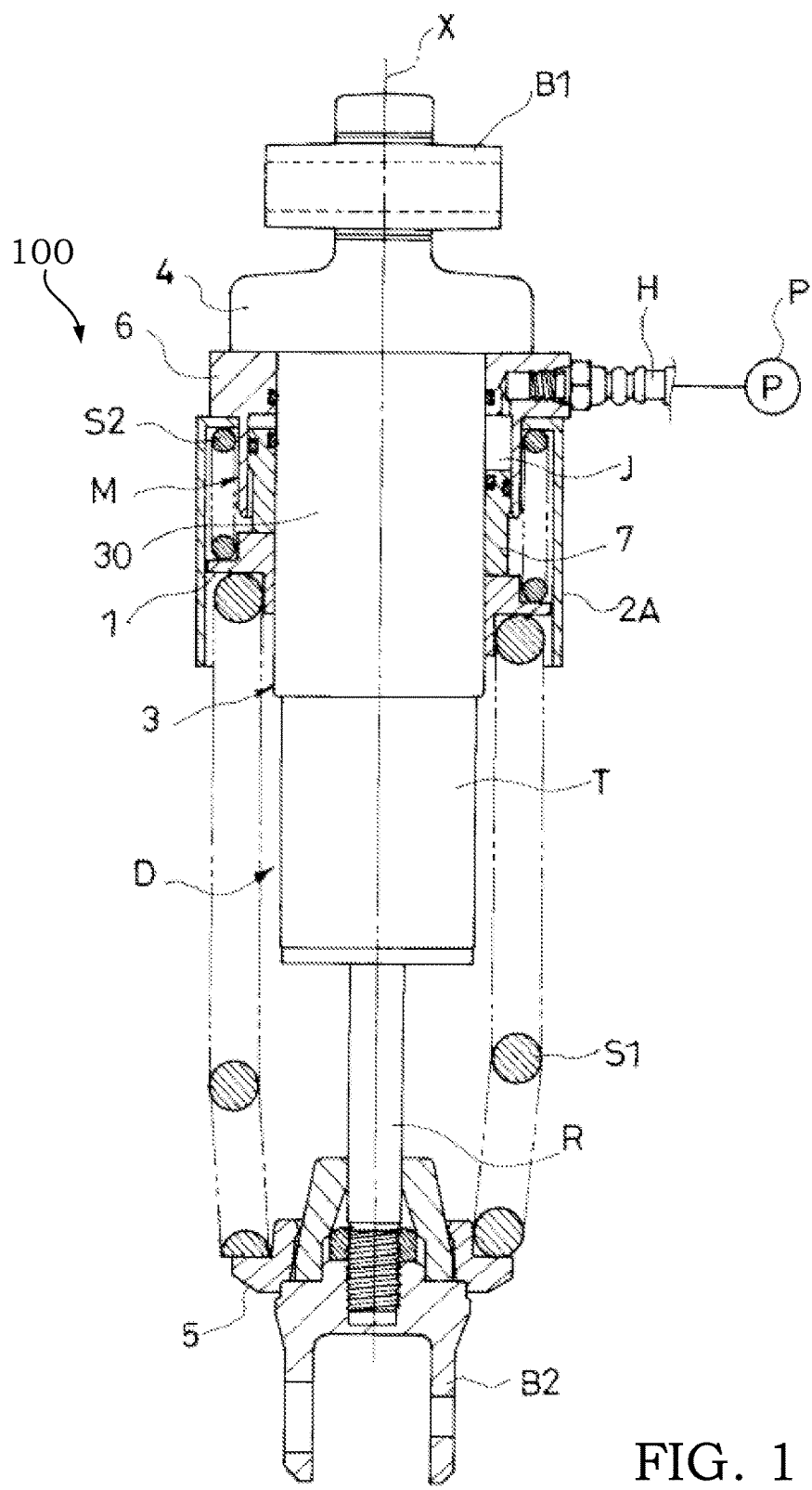
FIG. 1 is a front view showing a damper partially cut out, on which a vehicle height adjusting apparatus according to a first embodiment of the present invention is mounted.

FIG. 1 is a front view showing a damper D partially cut out, on which a vehicle height adjusting apparatus 100 according to the present embodiment is mounted. The same reference numerals given through several drawings denote the same or corresponding components, respectively.

As shown in FIG. 1, the vehicle height adjusting apparatus 100 includes: an annular movable spring receiver 1 in sliding contact with a guide surface 30 formed on an outer periphery of an outer tube T of the damper D, the annular movable spring receiver 1 being configured to support one side end (an upper end in FIG. 1) of a suspension spring S1 biasing the damper D in an expansion direction; a driving mechanism M configured to drive the movable spring receiver 1 in an axial direction of the damper D; an auxiliary spring S2 configured to bias the movable spring receiver 1 to a suspension spring side; and a dust cover 2A configured to cover a portion on the guide surface 30 with which the movable spring receiver 1 is in sliding contact. The dust cover 2A is held on the outer tube T by means of a spring force of the auxiliary spring S2.

The damper D is an inverted damper that includes: the outer tube T connected to a vehicle body side via a vehicle body side bracket B1; and a piston rod R connected to a wheel side via a wheel side bracket B2. The piston rod R is movably inserted into the outer tube T in the axial direction, and the damper D is expanded and contracted by the piston rod R going into/out of the outer tube T.

The damper D generates a predetermined damping force with expansion/contraction thereof to suppress an expansion/contraction motion of the suspension spring S1. Since any configuration may be adopted as a configuration in which the damper D generates the damping force, detailed explanation of the configuration is omitted. Further, the damper D may be an upright damper in which a piston rod R is connected to a vehicle body side and an outer tube T is connected to a wheel side.

A portion from a substantial center of the outer tube T to the vehicle body side (an upper side in FIG. 1) is covered by a cylindrical guide tube 3. A guide surface 30 formed smoothly is formed on an outer peripheral surface of the guide tube 3. The movable spring receiver 1 and a jack piston 7 which will be described later are in sliding contact with the guide surface 30 and can be smoothly moved along the guide tube 3.

A support member 4 projecting outward from the outer tube T is fixed on a vehicle body side end of the outer tube T (the upper end in FIG. 1). It is only necessary that the support member 4 is connected to the outer tube T so as not to move, and as a method of connecting the support member 4 to the outer tube T, an appropriate known method such as integral forming, screwing, fitting and the like may be adopted.

The suspension spring S1 made of a coil spring is mounted on an outer periphery of the damper D. The suspension spring S1 is interposed between the movable spring receiver 1 connected to the vehicle body side and a fixed spring receiver 5 connected to the wheel side to bias the movable spring receiver 1 and the fixed spring receiver 5 in a direction to be separated from each other. The suspension spring S1 biases the damper D in the expansion direction in which the piston rod R goes out of the outer tube T.

The movable spring receiver 1 is formed in an annular manner and in sliding contact with the guide surface 30 of the guide tube 3. The movable spring receiver 1 is movable in the axial direction of the damper D, and constitutes the vehicle height adjusting apparatus 100 for adjusting the vehicle height. The fixed spring receiver 5 is formed in an annular manner. The fixed spring receiver 5 is supported by the wheel side bracket B2, and is pressed onto the wheel side bracket B2 by means of the suspension spring S1 so that movement thereof in the axial direction is regulated.

The vehicle height adjusting apparatus 100 includes: the movable spring receiver 1; the driving mechanism M configured to drive the movable spring receiver 1 in the axial direction of the damper D; the auxiliary spring S2 configured to bias the movable spring receiver 1 to the suspension spring side; and the dust cover 2A configured to cover the portion in the guide surface 30 with which the movable spring receiver 1 is in sliding contact.

Figure 2:
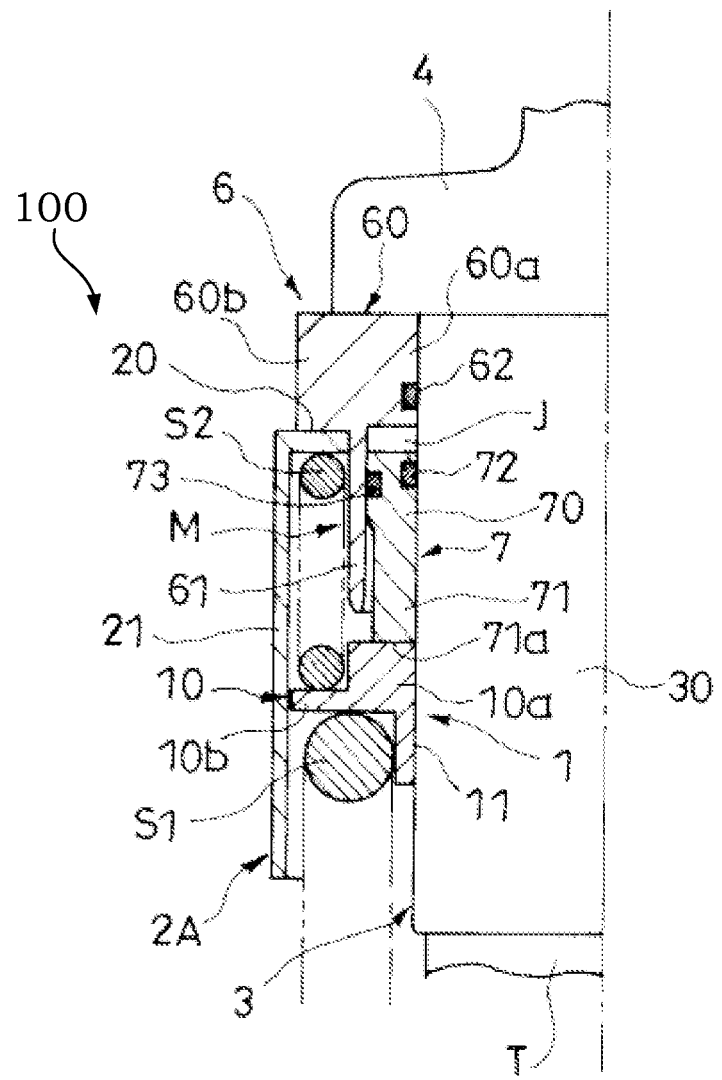
FIG. 2 is an enlarged view showing a major portion of FIG. 1 in an enlarged manner.

As shown in FIG. 2, the movable spring receiver 1 constituting the vehicle height adjusting apparatus 100 includes: an annular support portion 10 configured to support a vehicle body side end (one side end) of the suspension spring S1; and a cylindrical guide portion 11 configured to stand substantially perpendicularly from an inner peripheral edge of a suspension spring side surface (a lower surface in FIG. 2) of the support portion 10. The guide portion 11 supports an inner periphery of the vehicle body side end portion (one side end portion) of the suspension spring S1. A thickness of an inner periphery portion 10a in the support portion 10 is formed so as to be larger than a thickness of an outer periphery portion 10b. As a result, the inner periphery portion 10a protrudes to the side opposite to the suspension spring (an upper side in FIG. 2) compared with the outer periphery portion 10b.

The driving mechanism M constituting the vehicle height adjusting apparatus 100 and driving the movable spring receiver 1 includes: a housing 6 fixed to the outer periphery of the outer tube T and on the side opposite to the suspension spring of the movable spring receiver 1 (upper sides in FIGS. 1 and 2); a jack chamber J formed between the housing 6 and the guide surface 30 and filled with an operating fluid; a jack piston 7 brought into contact with the side opposite to the suspension spring of the movable spring receiver 1 (upper sides in FIGS. 1 and 2) and configured to be inserted movably between the housing 6 and the guide surface 30 to close an opening on the suspension spring side of the jack chamber J (lower sides in FIGS. 1 and 2); and the pump P (FIG. 1) configured to suction and discharge the operating fluid with respect to the jack chamber J.

The housing 6 constituting the driving mechanism M is formed into a bottomed cylindrical shape as shown in FIG. 2. The housing 6 includes an annular bottom portion 60 and a cylindrical portion 61 having a cylindrical shape. The cylindrical portion 61 stands substantially perpendicularly from the suspension spring side surface (the lower surface in FIG. 2) of the bottom portion 60. The housing 6 is arranged so as to cause the bottom portion 60 to face the vehicle body side (the upper side in FIG. 2) and to cause the cylindrical portion 61 to face the suspension spring side (a lower side in FIG. 2). Moreover, the housing 6 is pressed onto the support member 4 by the suspension spring S1, and is fixed in a locked state. Namely, the housing 6 is fixed to the outer tube T via the support member 4.

The cylindrical portion 61 of the housing 6 is arranged so that a predetermined gap is formed between the cylindrical portion 61 and an outer periphery of the guide surface 30 of the guide tube 3. In this gap, a non-compressive operating fluid is stored, and the annular jack chamber J is formed.

An inner periphery portion 60a of the bottom portion 60 in the housing 6 protrudes inward from the cylindrical portion 61, and an annular seal 62 is mounted on an inner periphery of the inner periphery portion 60a. The seal 62 is in close contact with the guide surface 30 of the guide tube 3. For this reason, the inner periphery portion 60a of the bottom portion 60 closes an opening on the side opposite to the suspension spring (the upper side in FIG. 2) of the jack chamber J in a liquid-tight manner, and prevents the operating fluid in the jack chamber J from flowing out of a gap between the bottom portion 60 of the housing 6 and the guide tube 3. An outer periphery portion 60b of the bottom portion 60 of the housing 6 projects outward from the cylindrical portion 61.

The jack piston 7 constituting the driving mechanism M includes: an annular piston portion 70 configured to be inserted movably between the cylindrical portion 61 of the housing 6 and the guide surface 30 of the guide tube 3 to close an opening on the suspension spring side (the lower side in FIG. 2) of the jack chamber J; and an extended portion 71 continuing to the suspension spring side (the lower side in FIG. 2) of the piston portion 70.

Annular seals 72 and 73 are respectively mounted on an inner periphery and an outer periphery of the piston portion 70. The inner peripheral side seal 72 is in sliding contact with the guide surface 30 of the guide tube 3, while the outer peripheral side seal 73 is in sliding contact with the inner peripheral surface of the cylindrical portion 61. Namely, the jack piston 7 is in sliding contact with the guide surface 30 of the guide tube 3 via the inner peripheral side seal 72, and is in sliding contact with the inner peripheral surface of the cylindrical portion 61 via the outer peripheral side seal 73. As a result, the jack piston 7 closes the opening on the suspension spring side (the lower side in FIG. 2) of the jack chamber J in the liquid-tight manner.

The extended portion 71 is configured so that a suspension spring side end portion 71a of the extended portion 71 protrudes downward compared with the cylindrical portion 61 of the housing 6 even in a case where the movable spring receiver 1 retreats the most and the jack piston 7 is at a jack minimum position where the jack piston 7 enters the housing 6 the most. Namely, an axial size of the jack piston 7 is set so that the suspension spring side end portion 71a of the extended portion 71 always protrudes from the housing 6.

As shown in FIG. 1, the pump P constituting the driving mechanism M is connected to the jack chamber J through a hose H, and is driven by a motor (not shown) to suction and discharge the operating fluid with respect to the jack chamber J. Since any constitution may be adopted as the constitution of the pump P, detailed explanation of the configuration of the pump P is omitted. Further, the pump P may be an electric pump driven by the motor, or may be a manual pump manually driven.

The auxiliary spring S2 constituting the vehicle height adjusting apparatus 100 together with the driving mechanism M is made of a coil spring. As shown in FIG. 2, the auxiliary spring S2 is arranged on an outer periphery of the cylindrical portion 61 of the housing 6. The auxiliary spring S2 is interposed between the outer periphery portion 10b of the support portion 10 of the movable spring receiver 1 and the outer periphery portion 60b of the bottom portion 60 of the housing 6. The auxiliary spring S2 is arranged in series with the suspension spring S1, and biases the movable spring receiver 1 to the suspension spring side (the lower side in FIG. 2) to compress the suspension spring S1.

Hereinafter, a force acting on the suspension spring S1 or the auxiliary spring S2 is referred to as a load. A load of the auxiliary spring S2 becomes the largest in a case where the movable spring receiver 1 retreats the most and the jack piston 7 is at the jack minimum position where the jack piston 7 enters the housing 6 the most. Hereinafter, the load of the auxiliary spring S2 at this time is referred to as a maximum load at assembling of the auxiliary spring S2. On the other hand, a load of the suspension spring S1 becomes the smallest when the jack piston 7 is at the jack minimum position and the damper D is expanded the most. Hereinafter, the load of the suspension spring S1 at this time is referred to as a minimum load at assembling of the suspension spring.

The maximum load at assembling of the auxiliary spring S2 is set so as to be smaller than the minimum load at assembling of the suspension spring S1. As a result, since the load of the auxiliary spring S2 is always smaller than the load of the suspension spring S1, the movable spring receiver 1 is always pressed onto the suspension spring side end portion 71a of the jack piston 7 by means of the suspension spring S1 and is maintained in a contact state.

The dust cover 2A constituting the vehicle height adjusting apparatus 100 includes: a seat portion 20 formed into an annular plate shape and with which the one side end of the auxiliary spring S2 (the upper end in FIG. 2) is brought into contact; and a cylindrical cover portion 21 standing from an outer peripheral edge of the seat portion 20. The dust cover 2A is arranged so as to cause the seat portion 20 to face the outer periphery portion 60b side of the bottom portion 60 of the housing 6, and arranged so that the cover portion 21 covers the movable spring receiver 1 and the auxiliary spring S2.

The auxiliary spring S2 is compressed by the suspension spring S1 via the movable spring receiver 1. For this reason, the seat portion 20 is pressed onto the bottom portion 60 of the housing 6 by means of a spring force (restoring force, reaction force) of the auxiliary spring S2, and the seat portion 20 is sandwiched by the auxiliary spring S2 and the bottom portion 60 of the housing 6. Thus, the dust cover 2A is held on the outer tube T of the damper D by means of the spring force of the auxiliary spring S2.

A length of the cover portion 21 of the dust cover 2A is set so that the movable spring receiver 1 does not protrude from the cover portion 21 even if the movable spring receiver 1 is moved. Namely, the cover portion 21 covers an entire portion of the guide surface 30 with which the movable spring receiver 1 is in sliding contact.

Next, an operation of the vehicle height adjusting apparatus 100 according to the present embodiment will be described.

A state of the vehicle height adjusting apparatus 100 in which the movable spring receiver 1 advances the most and the jack piston 7 is at a jack maximum position where the jack piston 7 retreats from the housing 6 the most is shown at the right side of a center line X in FIG. 1. When the pump P is driven so as to supply the operating fluid to the jack chamber J, the jack piston 7 is pushed out of the housing 6. For this reason, the outer tube T is pushed up to the upper side in FIG. 1 and the damper D is expanded, whereby the vehicle height is raised.

A state of the vehicle height adjusting apparatus 100 in which the movable spring receiver 1 retreats the most and the jack piston 7 is at the jack minimum position where the jack piston 7 enters the housing 6 the most is shown at the left side of the center line X in FIG. 1. When the pump P is driven so as to discharge the operating fluid from the jack chamber J, the jack piston 7 is pushed into the housing 6. For this reason, the outer tube T is moved to the lower side in FIG. 1, and the damper D is compressed, whereby the vehicle height is lowered.

Next, an operation and an effect of the vehicle height adjusting apparatus 100 according to the present embodiment will be described.

The vehicle height adjusting apparatus 100 includes: the annular movable spring receiver 1 in sliding contact with the guide surface 30 formed on the outer periphery of the outer tube T of the damper D, the annular movable spring receiver 1 being configured to support the one side end (the upper end in FIG. 1) of the suspension spring S1 biasing the damper D in the expansion direction; the driving mechanism M configured to drive the movable spring receiver 1 in the axial direction of the damper D; the auxiliary spring S2 configured to bias the movable spring receiver 1 to the suspension spring side; and the dust cover 2A configured to cover the portion on the guide surface 30 with which the movable spring receiver 1 is in sliding contact. The dust cover 2A is held on the outer tube T by means of the spring force of the auxiliary spring S2.

Therefore, in the vehicle height adjusting apparatus 100 provided with the auxiliary spring S2, the dust cover 2A is mounted by using the spring force of the auxiliary spring S2. For this reason, mounting of the dust cover 2A can be facilitated. Further, since the vehicle height adjusting apparatus 100 is provided with the auxiliary spring S2, the movable spring receiver 1 can be driven by means of a smaller force in a case where adjustment is made in the direction in which the vehicle height is raised. Moreover, since the vehicle height adjusting apparatus 100 is provided with the dust cover 2A, it is possible to suppress dusts from adhering onto the guide surface 30 with which the movable spring receiver 1 is in sliding contact, and the movable spring receiver 1 can be smoothly moved along the guide surface 30.

Moreover, the driving mechanism M includes: the housing 6 fixed to the outer periphery of the outer tube T and on the side opposite to the suspension spring of the movable spring receiver 1 (the upper side in FIG. 1); the jack chamber J formed between the housing 6 and the guide surface 30 and filled with the operating fluid; the jack piston 7 brought into contact with the side opposite to the suspension spring (the upper side in FIG. 1) of the movable spring receiver 1, and configured to be inserted movably between the housing 6 and the guide surface 30 to close the opening on the suspension spring side (the lower side in FIG. 1) of the jack chamber J; and the pump P configured to suction and discharge the operating fluid with respect to the jack chamber J.

Therefore, by suctioning and discharging the operating fluid with respect to the jack chamber J to cause the jack piston 7 to go into/from the housing 6, the movable spring receiver 1 can be driven easily via the jack piston 7.

Moreover, the seals 72 and 73 for ensuring the jack chamber J in the liquid-tight manner are provided in the jack piston 7, and the jack piston 7 is in sliding contact with the guide surface 30 via the seal 72. Since the dust cover 2A covers the portion of the guide surface 30 with which the movable spring receiver 1 is in sliding contact, it is possible to suppress the seal 72 from being scratched due to the dust adhering to the guide surface 30, and this makes it possible to improve durability of the seal 72.

Moreover, the housing 6 is formed into a bottomed cylindrical shape, and includes: the annular bottom portion 60 mounted on the outer periphery of the guide surface 30 in the liquid-tight manner; and the cylindrical portion 61 standing from the suspension spring side surface (the lower surface in FIG. 2) of the bottom portion 60. The jack chamber J is defined between the cylindrical portion 61 and the guide surface 30. The outer periphery portion 60b of the bottom portion 60 projects outward from the cylindrical portion 61, and the auxiliary spring S2 is interposed between the outer periphery portion 60b which is the outer periphery of the cylindrical portion 61 and the movable spring receiver 1.

Therefore, a mounting work of the auxiliary spring S2 can be facilitated. Further, since the auxiliary spring S2 is arranged on an outer periphery of the jack chamber J, the vehicle height adjusting apparatus 100 can be formed compactly.

Moreover, the dust cover 2A includes: the seat portion 20 formed into an annular plate shape and with which the one side end (the upper end in FIG. 2) of the auxiliary spring S2 is brought into contact; and the cylindrical cover portion 21 standing from the outer peripheral edge of the seat portion 20. The seat portion 20 is sandwiched by the auxiliary spring S2 and the outer periphery portion 60b of the bottom portion 60 in the housing 6, and the cover portion 21 covers the movable spring receiver 1 and the auxiliary spring S2.

Therefore, since the entire portion of the guide surface 30 with which the movable spring receiver 1 is in sliding contact can be covered by the dust cover 2A, smooth movement of the movable spring receiver 1 can be carried out more reliably. Further, since the dust cover 2A covers the movable spring receiver 1, the auxiliary spring S2, the jack piston 7, and the jack chamber J, it is possible to suppress dusts from adhering on the movable spring receiver 1, the auxiliary spring S2, the jack piston 7, and the jack chamber J.

Moreover, since the auxiliary spring S2 is arranged inside the dust cover 2A, a coil diameter of the auxiliary spring S2 can be made smaller compared with the case in which the auxiliary spring S2 is arranged outside the dust cover 2A, and this makes it possible to suppress a size increase of the auxiliary spring S2.

Moreover, since the vehicle height adjusting apparatus 100 is assembled by mounting the housing 6, the dust cover 2A, the auxiliary spring S2, and the movable spring receiver 1 on the outer periphery of the guide surface 30 in this order, assembling of the vehicle height adjusting apparatus 100 can be carried out easily.

Moreover, since the cover portion 21 of the dust cover 2A is directed downward, it is possible to suppress entry of water, dusts and the like into the dust cover 2A.

Next, a second embodiment will be described.

Figure 3:
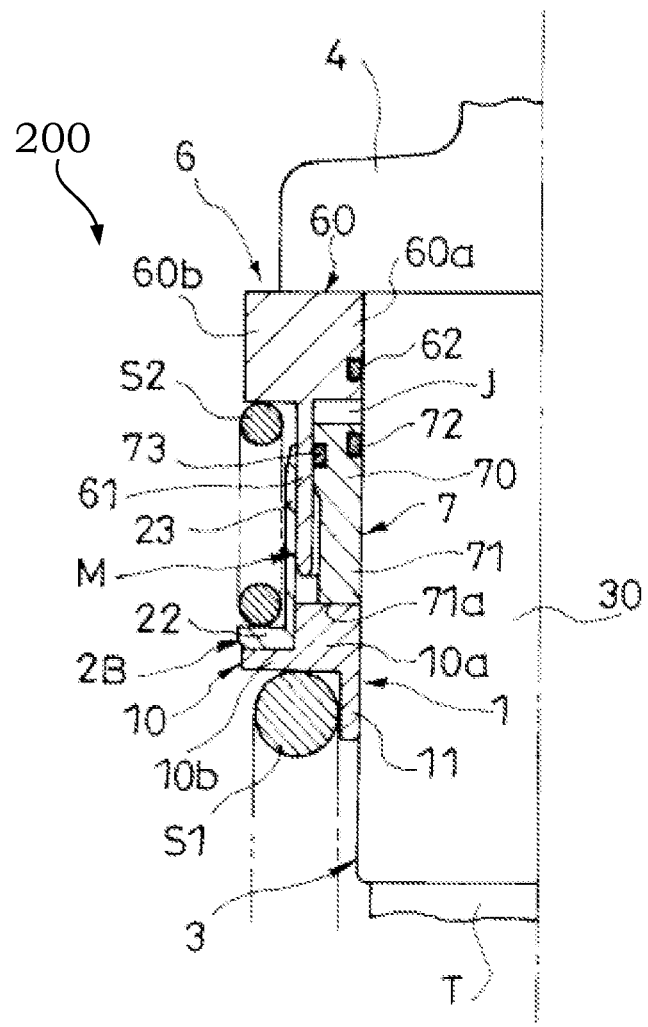
FIG. 3 is an enlarged view showing a major portion of a damper, on which a vehicle height adjusting apparatus according to a second embodiment of the present invention is mounted, in an enlarged manner.
Figure 4:
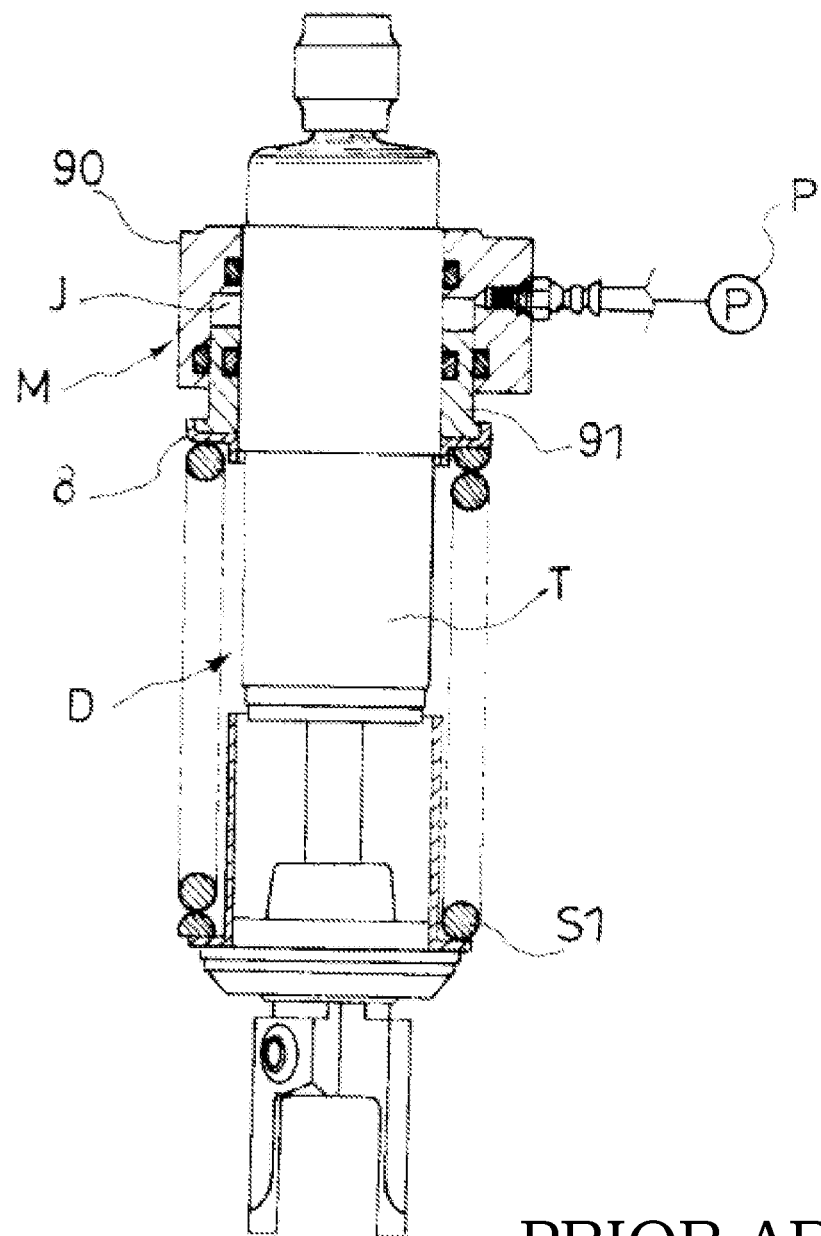
FIG. 4 is a front view showing a conventional damper partially cut out.
Figure 5:
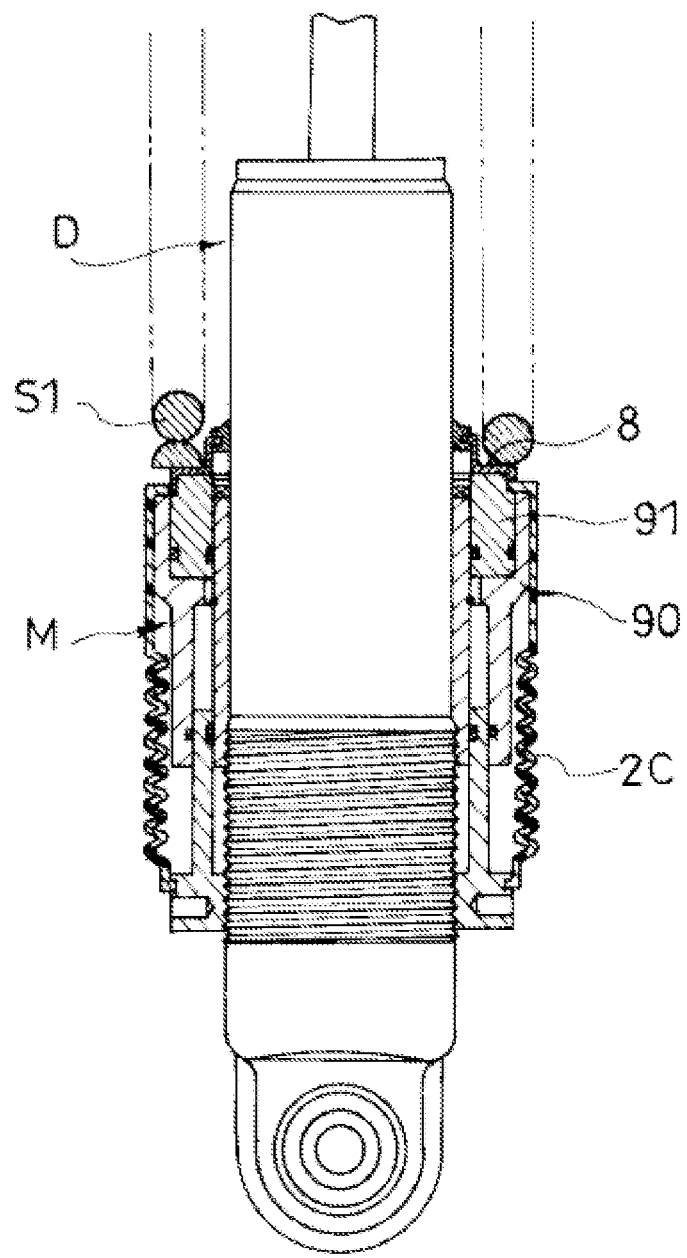
FIG. 5 is a front view showing a conventional damper partially cut out.

FIG. 3 is an enlarged view showing a major portion of a damper, on which a vehicle height adjusting apparatus 200 according to the present embodiment is mounted, in an enlarged manner. In the vehicle height adjusting apparatus 200 according to the present embodiment, only a configuration of a dust cover 2B is different from that of the first embodiment, and the other configurations are similar to those of the first embodiment. Therefore, only the dust cover 2B will be explained, and explanation for the other configurations will be omitted. In FIG. 3, the same reference numerals are given to the same configurations as those in the first embodiment.

As shown in FIG. 3, a dust cover 2B includes: a seat portion 22 formed into an annular plate shape and with which one side end (a lower end in FIG. 3) of an auxiliary spring S2 is brought into contact; and a cylindrical cover portion 23 standing from an inner peripheral edge of the seat portion 22. The dust cover 2B is arranged so as to cause the seat portion 22 to face a movable spring receiver 1 side, and arranged so that the cover portion 23 covers a cylindrical portion 61 of a housing 6.

The auxiliary spring S2 is compressed by the suspension spring S1 via the movable spring receiver 1. For this reason, the seat portion 22 is pressed onto a support portion 10 of the movable spring receiver 1 by means of the spring force (restoring force, reaction force) of the auxiliary spring S2, and the seat portion 22 is sandwiched by the auxiliary spring S2 and the support portion 10 of the movable spring receiver 1. Thus, the dust cover 2B is held on the outer tube T of the damper D by means of the spring force of the auxiliary spring S2.

The dust cover 2B is moved together with the movable spring receiver 1. A length of the cover portion 23 of the dust cover 2B is set so that a state overlapped with the cylindrical portion 61 of the housing 6 can be maintained even if the dust cover 2B is moved together with the movable spring receiver 1. As a result, the cover portion 23 of the dust cover 2B can always cover the portion at the jack chamber side (an upper side in FIG. 3) of the guide surface 30, with which the movable spring receiver 1 is in sliding contact, regardless of the sliding position of the movable spring receiver 1.

Next, an operation and an effect of the vehicle height adjusting apparatus 200 according to the present embodiment will be described.

Since the dust cover 2B is held on the outer tube T of the damper D by means of the spring force of the auxiliary spring S2, mounting of the dust cover 2B can also be carried out easily even in the vehicle height adjusting apparatus 200 provided with the auxiliary spring S2. Further, by providing the dust cover 2B, it is possible to suppress dusts from adhering to the guide surface 30 with which the movable spring receiver 1 is in sliding contact, and this makes it possible to move the movable spring receiver 1 smoothly along the guide surface 30.

Moreover, the dust cover 2B includes: the seat portion 22 formed into an annular plate shape and with which the one side end (the lower end in FIG. 3) of the auxiliary spring S2 is brought into contact; and the cylindrical cover portion 23 standing from the inner peripheral edge of the seat portion 22. The seat portion 22 is sandwiched by the auxiliary spring S2 and the movable spring receiver 1, and the cylindrical portion 61 of the housing 6 is covered by the cover portion 23.

Therefore, since the jack chamber side (the upper side in FIG. 3) of a portion of the guide surface 30 with which the movable spring receiver 1 is in sliding contact can be covered by the dust cover 2B, it is possible to move the movable spring receiver 1 smoothly. Further, since the dust cover 2B covers the movable spring receiver 1, the jack piston 7, and the jack chamber J, it is possible to suppress adhesion of dusts to these portions.

The embodiment of the present invention has been described above, but the above embodiment is merely examples of application of the present invention, and the technical scope of the present invention is not limited to the specific configurations of the above embodiment.

For example, in the embodiment described above, the guide surface 30 is formed on the outer peripheral surface of the guide tube 3 mounted on the outer tube T of the damper D. However, a part of the outer peripheral surface of the outer tube T may be configured so as to function as the guide surface 30.

Moreover, in the embodiment described above, the suspension spring S1 and the auxiliary spring S2 are constituted by a coil spring. However, either one of or both of the suspension spring S1 and the auxiliary spring S2 may be constituted by an elastic body such as an air spring, a rubber or the like.

Moreover, in the embodiment described above, the driving mechanism M includes the jack chamber J, the jack piston 7 and the pump P, and drives the movable spring receiver 1 via the jack piston 7 by suctioning and discharging the operating fluid with respect to the jack chamber J by means of the pump P. However, a constitution for driving the movable spring receiver 1 is not limited to the above configuration, and can be selected as appropriate.

Moreover, in the embodiment described above, the housing 6 includes the bottom portion 60 and the cylindrical portion 61, the jack chamber J is formed inside the cylindrical portion 61, and the auxiliary spring S2 is mounted on the outer side of the cylindrical portion 61. However, a shape of the housing 6 and a mounting position of the auxiliary spring S2 are not limited to those described above, and can be selected as appropriate.

Moreover, in the embodiment described above, the dust covers 2A and 2B respectively include the seat portions 20 and 22 each having the annular plate shape and the cylindrical cover portions 21 and 23. However, shapes and configurations of the dust covers 2A and 2B are not limited to those described above, and the shapes and configurations can be selected as appropriate. For example, the dust cover 2A of the first embodiment may be configured to be arranged so as to cause the seat portion 20 to face the movable spring receiver 1 side and so that the seat portion 20 is sandwiched by the auxiliary spring S2 and the movable spring receiver 1.

Moreover, a seal may be interposed between the dust cover 2A and the movable spring receiver 1 in the first embodiment or between the dust cover 2B and the cylindrical portion 61 of the housing 6 in the second embodiment. In this case, it is possible to suppress dusts from entering the dust covers 2A and 2B more reliably.

The present application claims priority based on Japanese Patent Application No. 2012-266948 filed with the Japan Patent Office on Dec. 6, 2012, the entire content of which is incorporated into the present specification by reference.

The invention claimed is:

1. A vehicle height adjusting apparatus, comprising:
    an annular movable spring receiver in sliding contact with a guide surface formed on an outer periphery of an outer tube of a damper, the movable spring receiver being configured to support one side end of a suspension spring, the suspension spring urging the damper in an expansion direction;
    a driving mechanism configured to drive the movable spring receiver in an axial direction of the damper;
    an auxiliary spring configured to be always compressed via the movable spring receiver by means of an urging force of the suspension spring, the auxiliary spring being configured to urge the movable spring receiver to the suspension spring side; and
    a dust cover configured to cover a portion on the guide surface, the movable spring receiver being in sliding contact with the guide surface in the portion,
    wherein the dust cover is held on the outer tube by means of a spring force of the auxiliary spring.

2. The vehicle height adjusting apparatus according to claim 1,
    wherein the driving mechanism includes:
    a housing fixed to the outer periphery of the outer tube and on a side opposite to the suspension spring of the movable spring receiver;
    a jack chamber formed between the housing and the guide surface, the jack chamber being filled with an operating fluid;
    a jack piston brought into contact with a side opposite to the suspension spring of the movable spring receiver, the jack piston being configured to be inserted movably between the housing and the guide surface, the jack piston closing an opening on the suspension spring side of the jack chamber; and
    a pump configured to suction and discharge the operating fluid to and from the jack chamber.

3. The vehicle height adjusting apparatus according to claim 2,
    wherein the housing is formed into a bottomed cylindrical shape, the housing including an annular bottom portion mounted on an outer periphery of the guide surface in a liquid-tight manner and a cylindrical portion having a cylindrical shape, the cylindrical portion standing from a surface on the suspension spring side of the bottom portion, the jack chamber being defined between the cylindrical portion and the guide surface, wherein an outer periphery portion of the bottom portion projects outward from the cylindrical portion, and wherein the auxiliary spring is interposed between the outer periphery portion of the bottom portion which is an outer periphery of the cylindrical portion and the movable spring receiver.

4. The vehicle height adjusting apparatus according to claim 3, wherein the dust cover is formed into an annular plate shape, the dust cover including a seat portion with which one side end of the auxiliary spring is brought into contact and a cylindrical cover portion standing from an outer peripheral edge of the seat portion, wherein the seat portion is sandwiched by the auxiliary spring and the outer periphery portion of the bottom portion of the housing, and wherein the movable spring receiver and the auxiliary spring are covered by the cover portion.

5. The vehicle height adjusting apparatus according to claim 3, wherein the dust cover is formed into an annular plate shape, the dust cover including a seat portion with which one side end of the auxiliary spring is brought into contact and a cylindrical cover portion standing from an inner peripheral edge of the seat portion, wherein the seat portion is sandwiched by the auxiliary spring and the movable spring receiver, and wherein the cylindrical portion of the housing is covered by the cover portion.

* * * * *